April 20, 1954  J. MARTIN  2,675,648
GLASS CUTTING APPARATUS
Filed Dec. 29, 1952  2 Sheets-Sheet 1
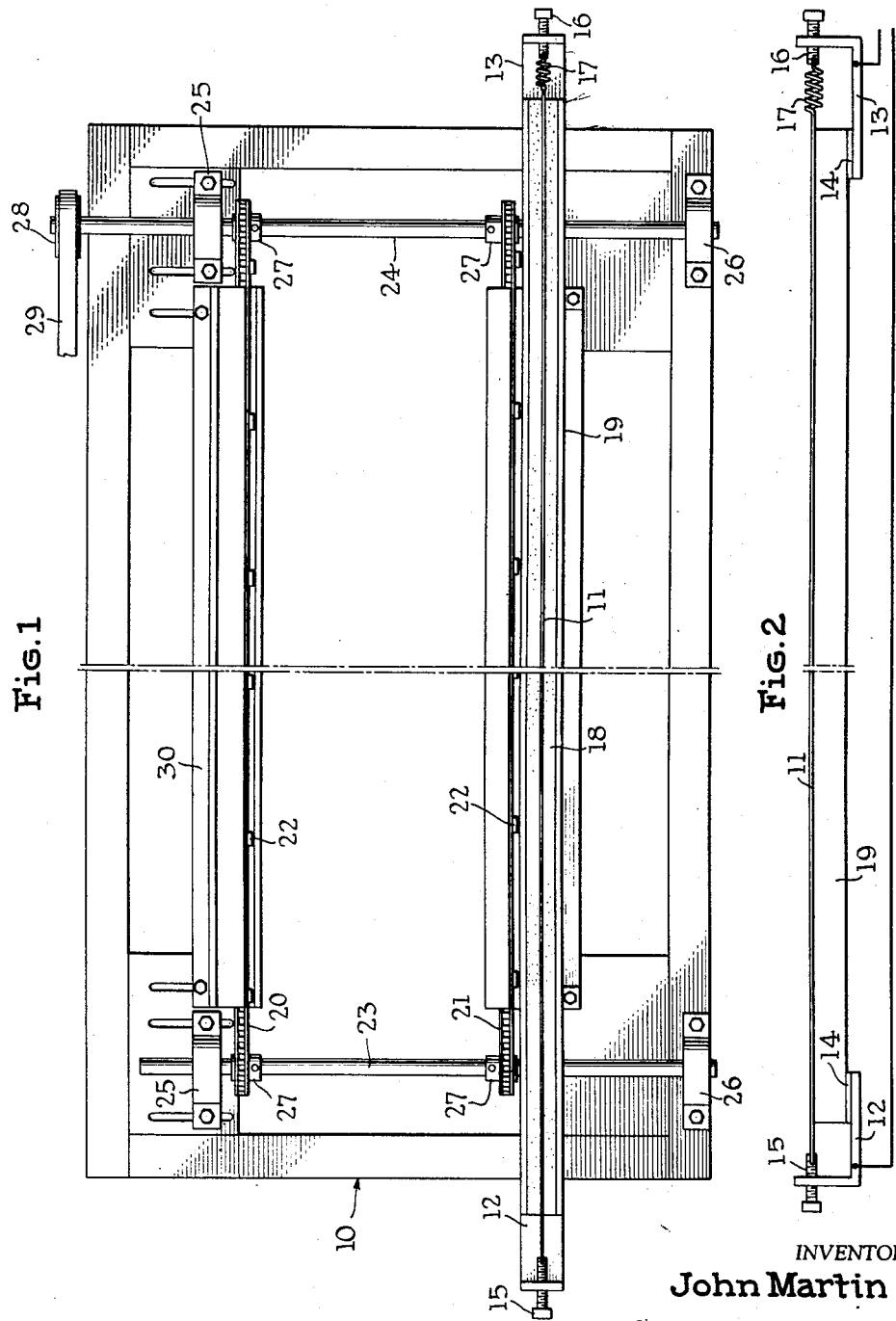
INVENTOR
John Martin
BY
ATTORNEY April 20, 1954     J. MARTIN     2,675,648
GLASS CUTTING APPARATUS
Filed Dec. 29, 1952     2 Sheets-Sheet 2

INVENTOR
John Martin

BY

ATTORNEY

Patented Apr. 20, 1954

2,675,648

UNITED STATES PATENT OFFICE 2,675,648

GLASS CUTTING APPARATUS

John Martin, Monterrey, Nuevo Leon, Mexico, assignor to Fabricacion de Maquinas, S. A., Monterrey, Nuevo Leon, Mexico, a corporation of Mexico Application December 29, 1952, Serial No. 328,409

8 Claims. (Cl. 49—50)

This invention relates to glass cutting machines and more particularly to machines which are used to remove the cullet from hollow glassware.

Glassware such as ordinary tumblers, goblets, and the like, all are formed initially with an upper portion known as a cullet. This portion is then removed by cutting and the edges are polished to form the finished article. Prior to the instant invention this cutting or "crack-off," as it is termed in the art, was accomplished by first scoring the glass along the desired line of cut, as for example, with the ordinary type of glass cutting tool well known to the art. The scored article was then tapped to cause separation along the line of the score or heat was applied either by means of a narrow gas flame or an electrically heated wire. Application of heat at the scored point would cause fracture due to the concentration of thermal stresses.

The instant invention has as its primary object the provision of an automatic "crack-off" machine in which no initial scoring or cutting of the hollow glass article is necessary.

In general, the object of this invention is achieved by rolling the hollow glassware along an electrically heated wire at the desired point of crack-off.

A more complete understanding of this invention may be had from a consideration of the attached sheets of drawing read in conjunction with the following specification.

Figure 1 shows a top plan view of a preferred embodiment of the invention,

Figure 2 is a side elevation of the wire and its supports, together with means for applying a source of electrical energy thereto.

Figure 3:
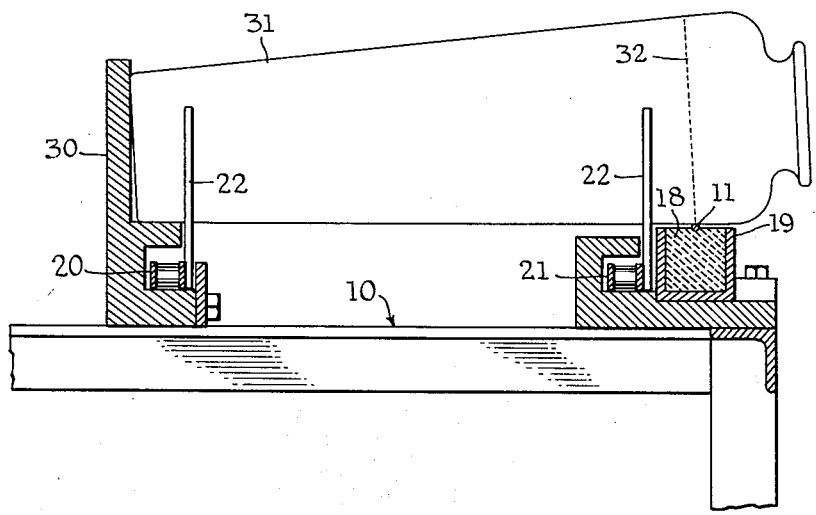
Figure 3 is a side elevation, partly in section, which shows one form of hollow glassware in cutting position on the machine.

Referring now to Figures 1 and 2 of the drawings, the apparatus is mounted on a base member or table 10. The cutting member comprises a wire 11 which extends at least the full width of the base and which is mounted on a pair of brackets 12 and 13, which may be insulated from the base member 10 by any convenient means, such as the slabs or inserts 14. The wire is attached to the bracket members by means of a pair of screws 15 and 16. A spring member 17 may be interposed between the wire and the screw 16 in order to provide a slight resilient connection between the screw 16 and the wire. Disposed immediately beneath the wire 11 and forming an insulating support therefor, is a block of ceramic or other suitable insulating material 18, the latter being supported in a trough-like member 19 which may be affixed to the base 10 in any suitable manner. This is shown most clearly in Figure 3. Any convenient means for supplying electrical energy for heating the wire 11 may be used. Connections for applying a source of potential to the wire 11 through the brackets 12 and 13 are schematically indicated in Figure 2. Obviously, either direct or alternating current could be used for this purpose.

The conveyor means is also mounted on the base 10 and includes a pair of endless chains 20 and 21. These chains each carry a plurality of upstanding lugs 22, as shown most clearly in Figure 3. A pair of shafts 23 and 24 are revolubly mounted at each end of the base member in pillow blocks 25 and 26. The pillow blocks 25 may conveniently be made adjustable as indicated in Figure 1. Each of the shafts 23 and 24 has mounted thereon a pair of sprocket gears 27 around which the chains 20 and 21 are entrained. Power may be supplied to the shaft 24 in any suitable fashion. As indicated in the drawing, this conveniently may be by means of a pulley 28 on the shaft 24 and belt 29 attached to a suitable source of power, not shown. The rear guide member 30, against which the bases of the hollow glass forms rest as they are conveyed through the machine, is made adjustable in a manner similar to the pillow blocks 26.

Figure 4:
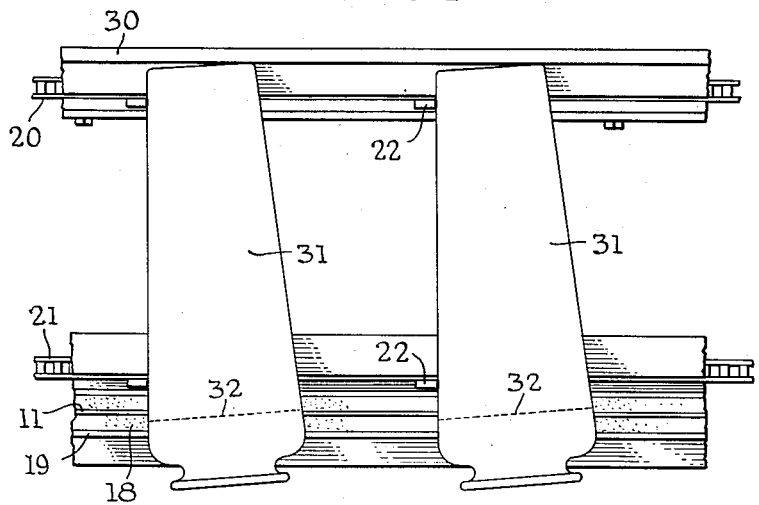
Figure 4 is a top plan view of the same portion of the machine as Figure 3.

The foregoing completes the description of one embodiment of the present invention. The operation is best described with reference to Figures 3 and 4. Hollow glass articles, such as those indicated by the reference numeral 31, Figures 3 and 4, are placed upon the conveyor portion of the machine at the loading end (that end remote from the pulley 28). The desired point of crack-off is indicated by the dotted line 32 and that portion above the line of crack-off is known as the cullet. The conveyor serves to roll the hollow glass forms along the length of the machine. The rear guide member 30 is, of course, first adjusted to a position which will place the desired point of crack-off of the glass article in contact with the heated wire 11. In order to assure a rolling contact between the glassware and the wire, the relative positions of the lugs 22 and hence the chains 20 and 21 must first be adjusted. Figure 4 shows this most clearly and the primary consideration is that the base of the article to be cut must assume a slight angle with reference to the rear guide member 30. This adjustment can readily be effected by loosening one or the other of the pairs of sprocket gears 27 and rotating the same on their respective shafts 23 and 24. While the hollow glassware shown in Figures 3 and 4 admits of substantial front to back alignment of the lugs 22, an article such as a stemmed goblet would obviously require a different relationship in order to assure that the base of the articles would lie at the desired angle to the rear guide member 30.

Once the articles are loaded upon the machine, the operation is entirely automatic. Each article in rolling upon the heated wire 11 has a high thermal stress set up at the point of contact between the article and the heated wire. As the article makes at least one complete revolution in traveling through the machine a desired crack-off of the cullet is automatically effected. The cracked-off cullet simply falls from the machine into any convenient receptacle arranged below the level of the wire 11.

From the foregoing it will be apparent that there is described and shown herein an extremely useful machine for automatically cutting off the undesired portion of a hollow glass form. The machine is simple, easy to manufacture, and the cost involved is small.

There will be variations obvious to those skilled in the art, all within the scope of the following claims.

I claim:

1. A glass crack-off machine comprising in combination: an electrically resistive wire; means for supporting said wire; means for connecting a source of electrical energy to said wire for heating the wire; and means for effecting a combined translational and rotational movement to a hollow glass form along the wire to cause fracture of the glass at the point of contact of the glass with the wire.

2. A glass crack-off machine comprising in combination: an electrically resistive wire; means supporting said wire in substantially horizontal position; means for connecting a source of electrical energy to opposite ends of said wire; and means for effecting a combined translational and rotational movement to a hollow glass form along said heated wire to cause fracture of the glass at the point of contact of the glass with the wire.

3. A glass crack-off machine comprising in combination: an electrically resistive wire; means supporting said wire in substantially straight line, horizontal position; means for connecting a source of electrical energy to opposite ends of said wire; and means for effecting a combined translational and rotational movement to a hollow glass form along said wire in its heated condition to cause fracture of the glass at the point of contact of the glass with the wire.

4. A glass crack-off machine comprising in combination: a base; an electrically resistive wire; means supporting said wire in substantially straight line, horizontal position on one side of said base; means for connecting a source of electrical energy to opposite ends of said wire; and conveying means disposed adjacent said wire on said base member, said last mentioned means including a pair of chains having a plurality of upstanding lugs thereon for rolling articles of hollow glassware along said wire.

5. Apparatus as defined by claim 1 and including means for adjustably tensioning the wire.

6. Apparatus as defined by claim 1 in which an elongated heat resisting insulating member is disposed beneath and in contact with said wire.

7. A glass crack-off machine comprising in combination: base members defining a frame support; an electrically resistive wire; means affording connection of a source of electrical energy to the ends of said wire; means supporting said wire in a horizontal, straight line position along the width of said frame; means for adjustably tensioning said wire; two pairs of sprockets, one pair revolubly mounted in spaced relation at each end of said frame; a pair of endless sprocket chains traveling over said sprockets; a plurality of upstanding lugs attached to said chains for conveying hollow glassware placed between said lugs along said frame in contact with said wire as said chains are driven by said sprockets; and means for adjusting the spacing between said chains for accommodating hollow glassware of varying sizes.

8. A glass crack-off machine comprising in combination: an elongated member including at least one surface which presents a line contact to a glass form placed in contact therewith; means for supporting said member; means for heating said member; and means for effecting a combined translational and rotational movement to a hollow glass form along the said surface and in line contact therewith to cause fracture of the glass along the line of contact between the glass and the said member.

References Cited in the file of this patent

UNITED STATES PATENTS

| Number | Name | Date |
|---|---|---|
| 317,805 | Lange et al. | May 12, 1885 |
| 1,473,675 | Halversen | Nov. 13, 1923 |
| 1,652,959 | Rolland | Dec. 13, 1927 |
| 1,719,588 | Campbell et al. | July 2, 1929 |
| 1,920,528 | Butler et al. | Aug. 1, 1933 |
| 1,973,546 | Spinasse | Sept. 11, 1934 |
| 2,410,931 | Eisler | Nov. 12, 1946 |
| 2,428,407 | Auzin | Oct. 7, 1947 |

FOREIGN PATENTS

| Number | Country | Date |
|---|---|---|
| 17,691 | Great Britain | July 15, 1893 |